Dec. 8, 1925.
H. McCAIN
1,564,698
VEHICLE DIRECTION INDICATOR
Filed April 8, 1924
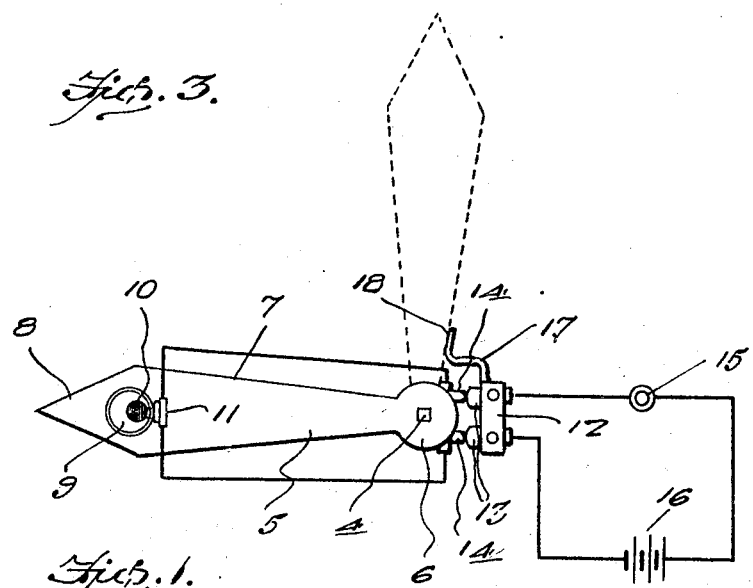
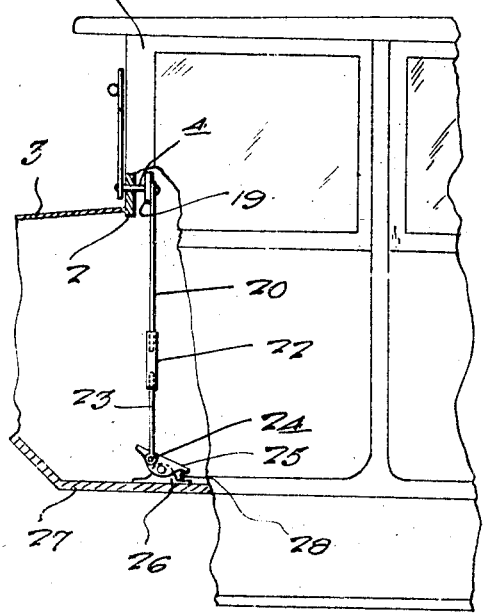
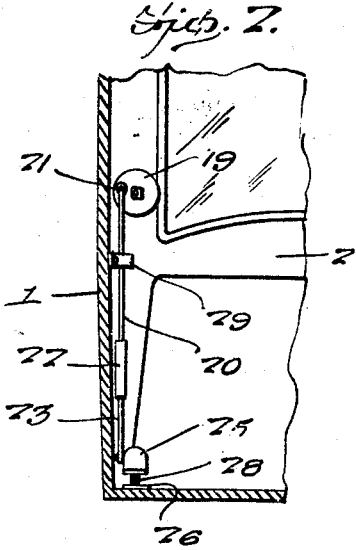
Inventor
H. Mc. Cain
By Clarence A. O'Brien
Attorney Patented Dec. 8, 1925.

1,564,698

UNITED STATES PATENT OFFICE.

HOWARD McCAIN, OF MARION, KENTUCKY, ASSIGNOR OF ONE-THIRD TO JOHN McCAIN AND ONE-THIRD TO MITCHELL JACKSON, BOTH OF MARION, KENTUCKY.

VEHICLE DIRECTION INDICATOR.

Application filed April 8, 1924. Serial No. 705,033.

*To all whom it may concern:*

Be it known that I, HOWARD McCAIN, a citizen of the United States, residing at Marion, in the county of Crittenden and State of Kentucky, have invented certain new and useful Improvements in Vehicle Direction Indicators, of which the following is a specification.

This invention relates to improvements in vehicle direction indicators, and particularly to a device of this character adapted for use on closed types of bodies.

An object of the invention resides in providing a direction indicator for the closed type bodies of automobiles having a signal arm mounted exteriorly of the body, on a shaft rotatably mounted in the forward end of the body and having means within the body for rotating said shaft for projecting the signal arm into signalling position or retracting it therefrom and positioning it against the body, in such a position that it will not be conspicuous in non-signalling relation.

Another object of the invention resides in providing a vehicle direction indicator for closed types of bodies, wherein a shaft is mounted in the forward end of the body at one side thereof, and which mounts on the outer end thereof a signal arm adapted to be moved into signalling or non-signalling position in the rotation of the shaft, means being provided on the outer side of the body for limiting the movement of the arm in moving it to non-signalling position, having contact thereon for cooperation with the contacts carried by the signalling arm, adapted to interpose the lighting means carried by the arm in circuit with the source of power carried in the automobile, while the inner side of the body receives an operating means for the shaft, which is connected thereto for rotating the shaft and includes a disc mounted on the inner end thereof with which is connected a rod adapted for operation by a foot pedal mounted for rocking movement on a suitable bracket secured to the floor board of the body, and having resilient means for normally holding the signal in retracted or non-signalling position.

The invention also includes other objects and improvements in the details of construction and arrangement of the parts, which are more particularly pointed out in the following description and claim directed to a preferred from of the invention, it being understood, however, that variations may be made in the specific construction and assemblage of these parts without departing from the spirit and scope of the invention, as described and claimed.

In the drawings, forming a part of this application:

Figure 1 is a side elevational view of a portion of a vehicle body, with parts broken away with the improved direction indicator attached thereto.

Figure 2 is a vertical sectional view through a portion of the automobile body, taken at right angles to the direction of Figure 1, showing the position of the parts of the invention.

Figure 3 is an enlarged detail view, of the signal arm, showing the member for limiting the rotating movement thereof, and the contacts for interposing the electric lamps carried thereby in circuit with the batteries.

1 indicates a closed type of automobile body, the front side of which is indicated at 2, and from which extends the hood 3.

The improved signal constructed according to this invention includes a shaft 4, rotatably mounted in the front side 2 of the vehicle body, and adjacent the side portion thereof as indicated at Figure 2, the forward end of the shaft being flared for receiving the signal arm 5, which is provided with an enlarged annular end portion 6 provided with a squared opening to fit on the squared end of said shaft, so that the signal arm will rotate with the shaft, in the rotation thereof. The signal arm 5 is of increasing width from the disc portion 6 toward the outer end thereof as indicated at 7, while the outer end is tapered to a point as indicated at 8, in order to provide a characteristic form of signal arm for readily indicating the signalling operation thereof. The enlarged outer end of the signal arm is formed with an opening 9, in which is mounted an electric bulb 10, carried by a socket 11, mounted on the signal arm, so that when the bulb is illuminated, a red light may, if desired, be produced in connection with the operation of the signal arm for use at night. A bracket 12 is mounted on the front end of the automobile body 2, adjacent the shaft 4, and carries a pair of contact members 13, for cooperation with contacts 14 on the disc 6 of the signal arm so that when the arm is in signalling position, as shown in full lines in Figure 3, the contact 14 will engage the contact 13 and close the circuit through the switch 15 and the battery 16 for illuminating the electric bulb 10. The bracket 12 is provided with an extension 17, having an offset end 18, adapted to engage in one edge of the signal arm 5, when the same is rocked to non-signalling position as shown in dotted lines in Figure 3, for preventing further rotative movement of said signal arms away from the signalling position.

An operating disc 19 is mounted on the inner end of the shaft 4, and with which is connected an operating wire 20, as indicated at 21, adapted for movement to rotate said operating disc in the operation of said operating rod. The turn buckle is indicated at 22, threadedly mounted on the end of the rod 20, and also threadedly connected with a rod 23 pivotally connected at 24 to a foot pedal 25, mounted for rocking movement on the bracket 26, secured to the floor 27 of the vehicle. A spring 28 is positioned between the bracket 26 and the foot pedal 25, for normally forcing said foot pedal in one direction on the pivot with the bracket, which is adapted to move the operating rod 20 through the connections therewith for rotating the operating disc and holding the signal arm 5 in inoperative or non-signalling position, a guide 29 secured to the side of the body receives the rod 20 and guides the same in the operation of the signal arm.

In operation, it will be seen that the driver of the vehicle may conveniently operate the signal arm by placing his foot on the pedal 25, and rocking the same for operating the rod 20, operating the disc 19, and rotating the shaft 4 to project the signal arm 5 from the side of the vehicle so that it will be clearly observed from the rear thereof, and apprise drivers of vehicles in the rear that a stopping or turning of the vehicle is contemplated, so that they will drive with caution.

It will be seen from the above description, that a highly efficient and simple direction signal has been provided, for closed types of automobiles, which may be operated from the inside thereof.

What is claimed is:

A structure of the class described comprising a horizontal shaft adapted to be rotatably mounted upon a support, an arm secured to and extending angularly from one end of the shaft for rotation with the latter, a disc fixed to the opposite end of said shaft, an operating rod, said rod being composed of sections, said sections being adjustably connected together, and one of the sections being eccentrically connected with said disc, and manually manipulated means cooperating with the other section for effecting operation of said rod and shafts.

In testimony whereof I affix my signature.

HOWARD McCAIN.